United States Patent

Bolwell

[11] Patent Number: 6,092,858
[45] Date of Patent: Jul. 25, 2000

[54] MOULDED INTERIOR DOOR PANEL

[75] Inventor: Graeme Bolwell, Frankston, Australia

[73] Assignee: Nylex Corporation Limited, Melbourne, Australia

[21] Appl. No.: 08/983,231
[22] PCT Filed: Jul. 12, 1996
[86] PCT No.: PCT/AU96/00436
    § 371 Date: Mar. 25, 1998
    § 102(e) Date: Mar. 25, 1998
[87] PCT Pub. No.: WO97/03806
    PCT Pub. Date: Feb. 6, 1997

[30] Foreign Application Priority Data

Jul. 14, 1995 [AU] Australia ............... PN 4162

[51] Int. Cl.⁷ ........................................ B60J 5/00
[52] U.S. Cl. ............... 296/146.7; 296/152; 428/198; 156/212; 156/216
[58] Field of Search ............... 428/76, 192; 296/146.7, 296/39.1, 153, 152; 49/502; 156/216, 212

[56] References Cited

U.S. PATENT DOCUMENTS

| 2,804,909 | 9/1957 | Hammer ................... 156/212 |
| 2,890,919 | 6/1959 | Hansen ................... 156/216 X |
| 3,936,520 | 2/1976 | Garofalo ................... 156/212 X |
| 4,243,456 | 1/1981 | Cesano ................... 156/214 |
| 4,328,067 | 5/1982 | Cesano ................... 156/511 |
| 4,459,331 | 7/1984 | Brix et al. ................... 428/71 |
| 4,692,108 | 9/1987 | Cesano ................... 425/292 |
| 4,978,407 | 12/1990 | Ardissone ................... 156/216 |
| 5,037,687 | 8/1991 | Kargarzadeh et al. ................... 428/71 |
| 5,108,143 | 4/1992 | Miwa ................... 296/97.1 |
| 5,318,647 | 6/1994 | Mitchell ................... 156/216 |
| 5,641,379 | 6/1997 | Cesano ................... 156/580 |

FOREIGN PATENT DOCUMENTS

| 1116603 | 6/1989 | Japan ................... 296/152 |
| 405069744 | 3/1993 | Japan ................... 296/146.7 |
| 405220843 | 8/1993 | Japan ................... 156/212 |
| WO 9528272 | 10/1965 | WIPO . |
| WO 9425248 | 11/1994 | WIPO . |
| WO 9425249 | 11/1994 | WIPO . |
| WO 9425250 | 11/1994 | WIPO . |

Primary Examiner—Dennis H. Pedder
Attorney, Agent, or Firm—Hovey, Williams, Timmons & Collins

[57] ABSTRACT

A molded interior door panel (10) for a vehicle including: a thermoformable sheet (12) and an insert (14) wherein a portion of said thermoformable sheet at least partially envelopes and retentatively grips said insert. The insert (14) and sheet (12) may cooperatively form the interior door pull (26) of a vehicle door where the door pull (26) forms an integral part of and is contiguous with the door panel (10) avoiding evident junction lines between the door panel and handle.

18 Claims, 5 Drawing Sheets

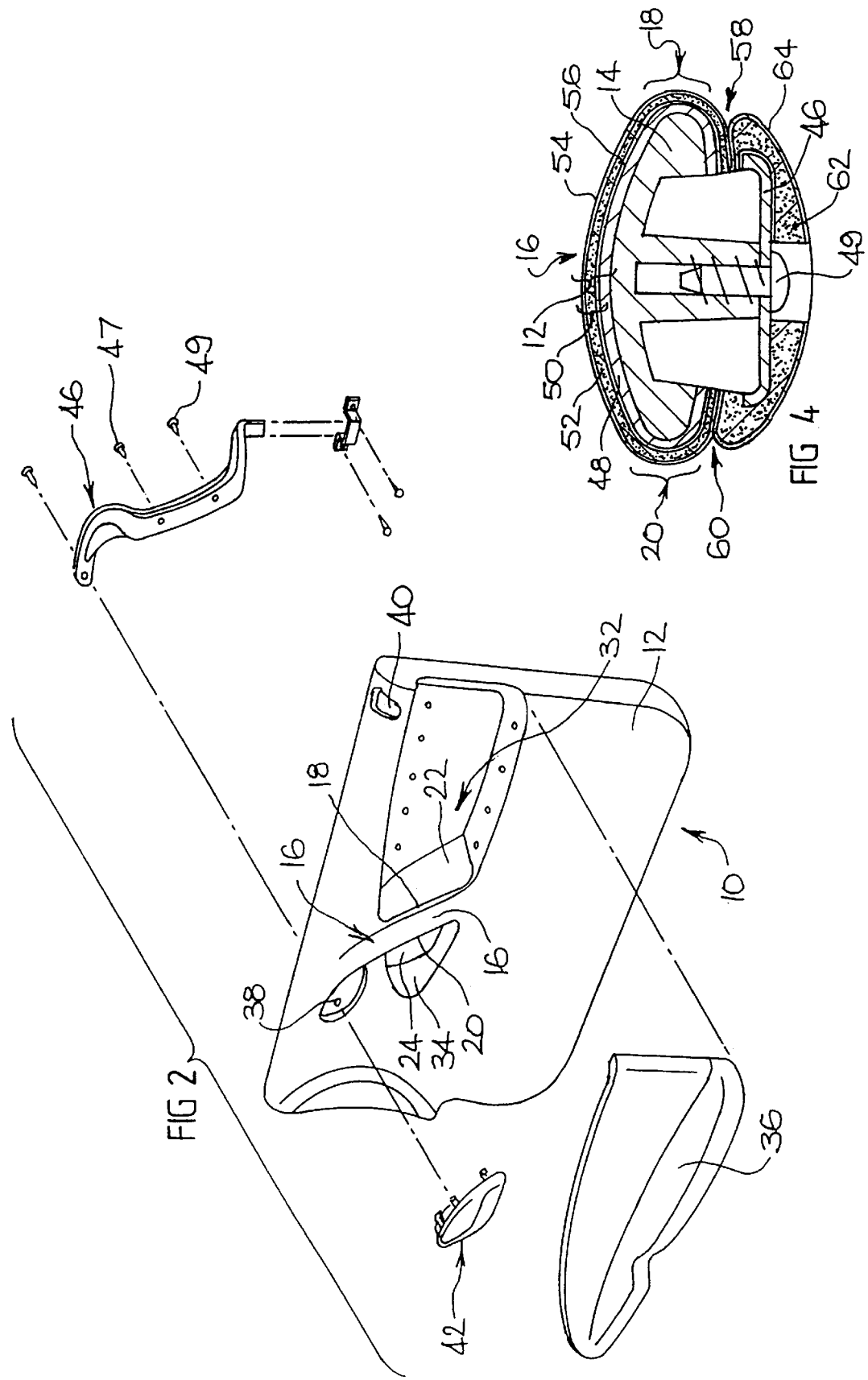

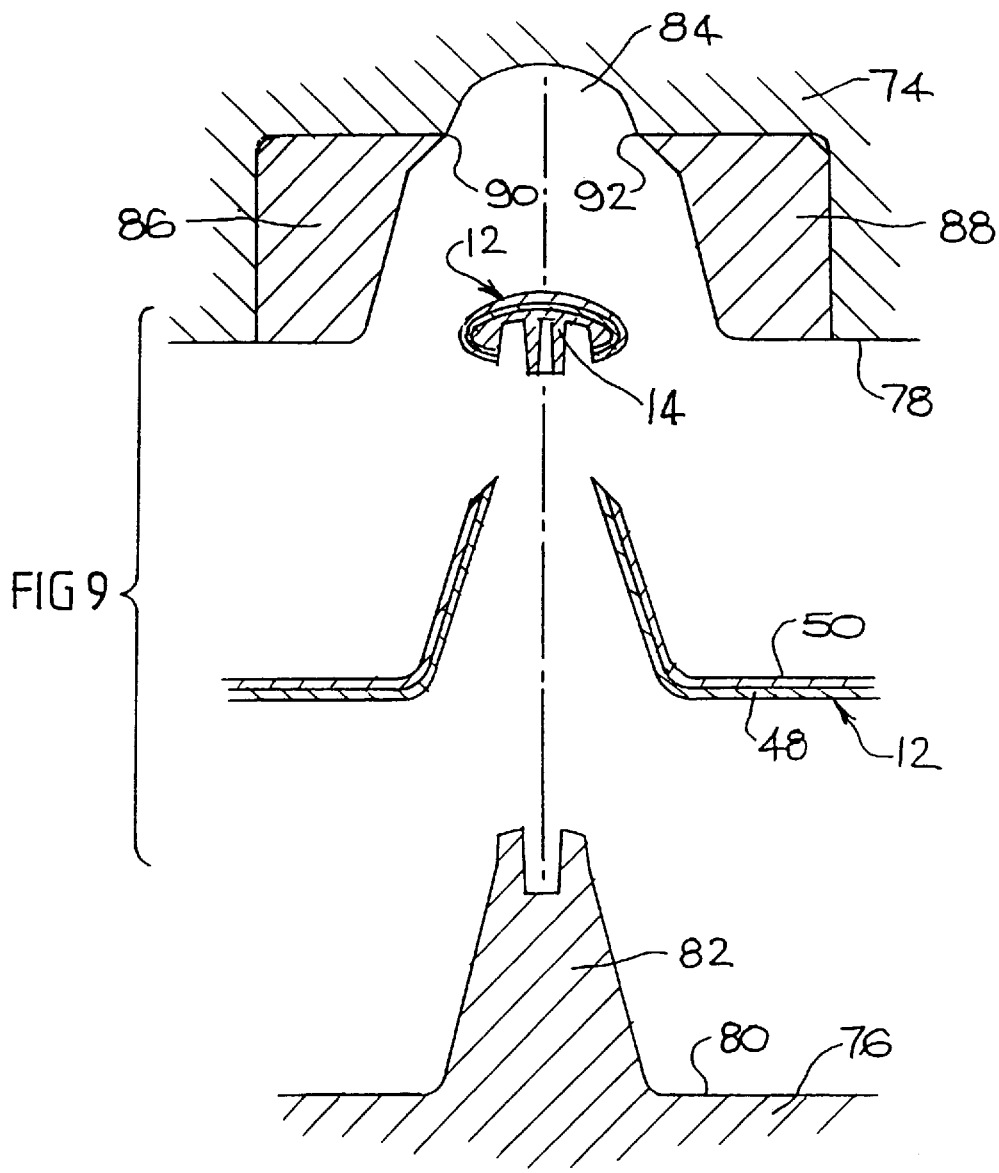
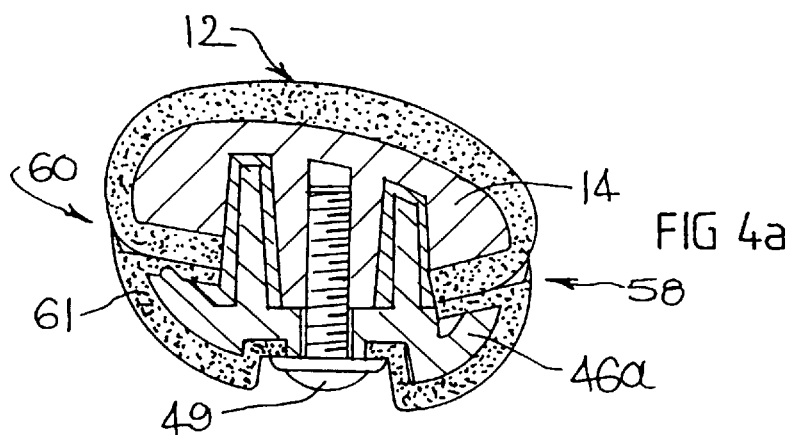

MOULDED INTERIOR DOOR PANEL

BACKGROUND OF THE INVENTION

1 Field of the Invention

The present invention relates to a moulded article and a method of manufacturing the moulded article. More particularly the invention relates to moulded articles in the form of panels. It will be convenient to describe the invention with particular reference to the laminated panels for use as interior door trim panels or other vehicles, although it will be appreciated that the invention may have wider application.

2. Description of the Prior Art

Interior trim mouldings for vehicles such as door panels are known in the art. Such door panels are used to form the interior covering of a vehicle door and are designed with both safety and aesthetic consideration in mind Aesthetically the door panel is preferably visually and tactually appealing, while at the same time it should have no sharp edges and is preferably slightly compressible so as not to cause injury to vehicle occupants in the event of a collision. One type of door panel consists of a thermofortmable rigid substrate layer to which there is laminated a soft compressible sheet having an outer covering which forms the visible surface of the door trim i.e. on the vehicle cabin side of the door. The manufacture of such panels is disclosed in U.S. Pat. No. 4243456, U.S. Pat. No. 4328067 and G.B. 2195940 and is commonly known in the art as the "WOODSTOCK"® process.

The process known in the art for manufacturing such door trim involves press moulding a substrate layer or sheet of a normally rigid thermoplastic material generally having a thickness between about 1 and 10 mm and a cover layer sheet of a normally pliable and compressible decorative material. A suitable material for the thermoplastic substrate is disclosed in British Patent Specification No. 1457015 and comprises a blend of a thermoplastic polymer such as polypropylene and a non-thermoplastic filler such as saw dust; such a composition is "thermoplastice" in the sense used herein and can be thermally plastified by heating to a temperature well above the melting point of the polymer constituent. The cover layer sheet materials often used are foamed vinyl laminates having an exterior decorative skin, an interior woven or non-woven textile layer and a foamed interlayer between the interior and exterior layers. The substrate is heated to a temperature where it becomes plasticised and is introduced into a moulding press with the cover layer sheet whereupon the press closes and bonds the cover layer and substrate together while simultaneously forming the substantially flat sheets into the three dimensional door trim. When the substrate cools and solidifies, the formed door panel is removed from the mould.

Door panels made using the "WOODSTOCKI™" process may have sections cut into them for the provision of various features such as handles, window or door opening devices, lights, control panels and contrasting soft panels and panels of fabric such as velour, suede, cloth or leather. In vehicular design it is desired to provide door panels with as streamline a look as possible. It is also desired to make the handle for pulling the door closed, hereinafter called the door pull, as pleasant to use as possible as this is one of the first features a potential purchaser of the car uses. In the past door pulls have been separate accessories that have been slotted into a portion cut-out of the door panel or affixed onto or through the door panel. Inserted door pulls rely upon the strength of the door panel to transfer force applied by the vehicle occupant to the door itself, which can be unsatisfactory in many cases. With door pulls which are bolted or screwed onto the door through the door panel the join between the door pull and the door panel is aesthetically displeasing but has hitherto proved impossible to eliminate.

SUMMARY OF THE INVENTION

The present invention provides a door panel which has an integral door pull feature.

According to the present invention there is provided a moulded interior door panel comprising:

a thermoformable sheet; and an insert, wherein a portion of said thermoformable sheet at least partially envelops and retentively grips the insert.

Preferably the thermoformable sheet comprises a thermoformable substrate having an upper surface and a lower surface, and a compressible cover layer sheet bonded with said upper surface and whereby the insert abuts and is at least partially enveloped by a portion of the lower surface of the substrate. The compressible cover layer sheet may consist of a foam interlayer having an exterior decorative skin which comprises the visible surface of the door panel when positioned in a vehicle, and an interior fabric layer which is bonded to the upper surface of the thermoformable substrate.

Preferably the thermoformable substrate is made from a blend of a thermoplastic polymer such as polypropylene and a filler such as wood dust sawdust.

The thermoformable sheet at least partially envelops and retentively grips the insert. In one embodiment part of the thermoformable sheet gripping the insert forms a bridge which has a surface continuous with the remainder of the thermoformable sheet but which is raised in profile relative to areas lateral to the bridge. Preferably portions of the sheet lateral to the bridge are cut away such that the bridge and insert may form part of a door pull. Furthermore there may be provided a recess in the areas lateral to the bridge into which may be positioned a trim feature such as a moulded armrest. The overall effect of such an arrangement is that the door panel includes an integral door pull and has a streamlined appearance with no joins or seams visible between the door pull and the remainder of the sheet.

Preferably the bridge has shoulders which tuck at least partially around the insert and thereby retentively grip the insert. In transverse section through the bridge and insert the shape of the thermoformable sheet forming the bridge and gripping the insert, may be "C" shaped, such that the shoulders form re-entrant portions. It is preferred that the decorative skin overlies the re-entrant portions such that none of the thermoformable substrate is visible. The insert may be adapted to be fixed directly or indirectly to the vehicle door.

There may further be provided a reinforcement member connectable to the insert which is adapted to be fixed to the frame or some other part of the vehicle door such that force applied to the door pull is transferred to the door via the reinforcement member. The reinforcement member may be connected to the insert by any suitable means known in the art for example screws or rivets. Preferably the reinforcement co-operates with and is of complimentary design to the bridge and insert so that together these features form a door pull shaped such that it can be comfortably gripped by a vehicle occupant. In a preferred embodiment the portion of reinforcement which forms part of the door pull is covered with a compressible material which may be similar to the compressible cover layer described above. In one embodiment the reinforcement member attaches to the insert and overlies the re-entrant portions of the bridge, further entrapping the insert.

In another aspect of the invention there is provided a method for producing a moulded door panel including the steps of:

(a) providing a moulding press including at least one moulding die having first and second die members moveable in a reciprocating manner along a first axis between an open die position and a closed die position, said first and second members having opposite die faces defining a mould cavity therebetween when said moulding die is in said closed position, said first die member having in said die face a region defining a recess and further including projecting means adjacent the recess having an engagement surface moveable along a path angularly offset said first axis in a reciprocating manner when said moulding die is in said closed position between a position outside said cavity to a position within said cavity and said second die member has a projecting portion in its die face insertable into said cavity when said die members are in said closed position;

(b) introducing a thermally plastified sheet between said die faces when said die members are in said open die position;

(c) moving said die members to said closed position such that the portion of said sheet overlying said recess is deformed into said recess to form a projecting part;

(d) moving said projecting means such that said engagement surface moves into said recess and deforms said projecting part to form a re-entrant surface;

(e) allowing said thermally plastified sheet to cool to at least partially solidify;

(f) moving said projecting means to said position where engagement surface is outside the recess;

(g) moving said die members to said open die position; and (h) ejecting said moulded door panel.

In a preferred embodiment there is also provided the step of positioning an insert on said projecting position of said second die face.

It will now be convenient to describe the invention in more detail with reference to a preferred embodiment shown in the accompanying drawings. It should be understood that the drawings and the following description are to a preferred embodiment only and are not intended to limit the scope of the invention.

BRIEF DESCRIPTION OF THE INVENTION

FIG. 2 is an exploded view of a door panel of the present invention with the insert shown in ghost lines as viewed from the side on the interior of a vehicle.

FIG. 4 is a transverse section of a door pull of the door trim of FIG. 1 along line 11.

FIG. 4A is an alternative embodiment of the transverse section of the door pull of the door trim of FIG. 1.

FIG. 5 to 9 are sections through a mould of the present invention showing consecutive steps of processing.

FIG. 5 shows a stage prior to forming where the die portions are in an open position.

FIG. 6 shows a first forming stage where the die portions move to a closed position.

FIG. 7 shows a secondary forming stage where sliding members move into a mould recess.

FIG. 8 shows the formed panel with the sliding members retracted.

FIG. 9 shows the final step with the panel is ejected from the mould which is an open position.

DESCRIPTION OF THE PREFERRED EMBODIMENTS

Figure 1:
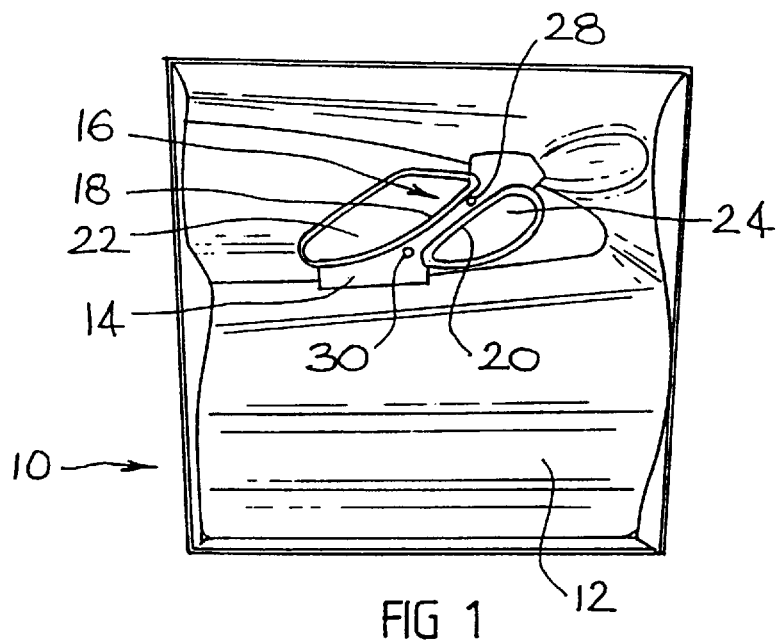
FIG. 1 is a perspective view of a door panel of the present invention as viewed from the side which faces into the car door to which it is affixed.

In FIG. 1 door panel 10 consists of a thermoformable sheet 12 and an insert 14. Door panel 10 is shown to be substantially rectangular however it will be appreciated that it may be in any suitable shape depending upon the styling requirements of the vehicle to which the door panel is to be attached. Insert 14 may be a rigid moulded thermoplastic or thermosetting polymeric piece or a moulded or pressed metal piece. The thermoformable sheet 12 partially envelopes and retentively grips the insert 14 in the region of bridge 16 (shown from the under side) in FIG. 1. Bridge 16 has shoulders 18 and 20 which extend substantially along the length of bridge 16 which tuck around insert 14 and thereby retentively grip the insert 14 by pressing against the portion of the insert 14 underlying the bridge 16. Lateral portions 22 and 24 lateral to bridge 16 are cut out, from the sheet 12 so that the bridge 16 and insert 14 form part of a door pull 26 which can be gripped by the hand of an occupant in the vehicle to which the door panel 10 is attached. Holes 28 and 30 are provided in insert 14 to accommodate screws or the like to secure reinforcement (not shown in FIG. 1) to the insert 14.

In FIG. 2, door panel 10 is shown from the side which is visible in the cabin of a vehicle. It can be seen that bridge 16 has a surface continuous with the remainder of the thermoformable sheet 12, i.e. there are no lines of juncture between the bridge 16 and the rest of the door panel 10. The bridge 16 is raised in profile relative to areas 32 and 34 lateral to the bridge 16, including cut-out lateral portions 22 and 24. Area 32 forms a recess functional as an arm-rest of the door panel 10. Armrest trim 36 is positioned in areas 32 and 34 and fits behind bridge 16. Armrest trim is preferably manufactured as a separate article and is covered in a suitably decorative covering as is well known to the skilled addressee, and is affixed to door panel 10 by any suitable means. Remote handle assembly recess 38 and door lock recess 40 are similarly provided to accommodate a remote handle 42 and locking button assembly 44 (not shown in FIG. 2). Other features such as window winders, control panels, switches etc. may also be provided as required.

Figure 3:
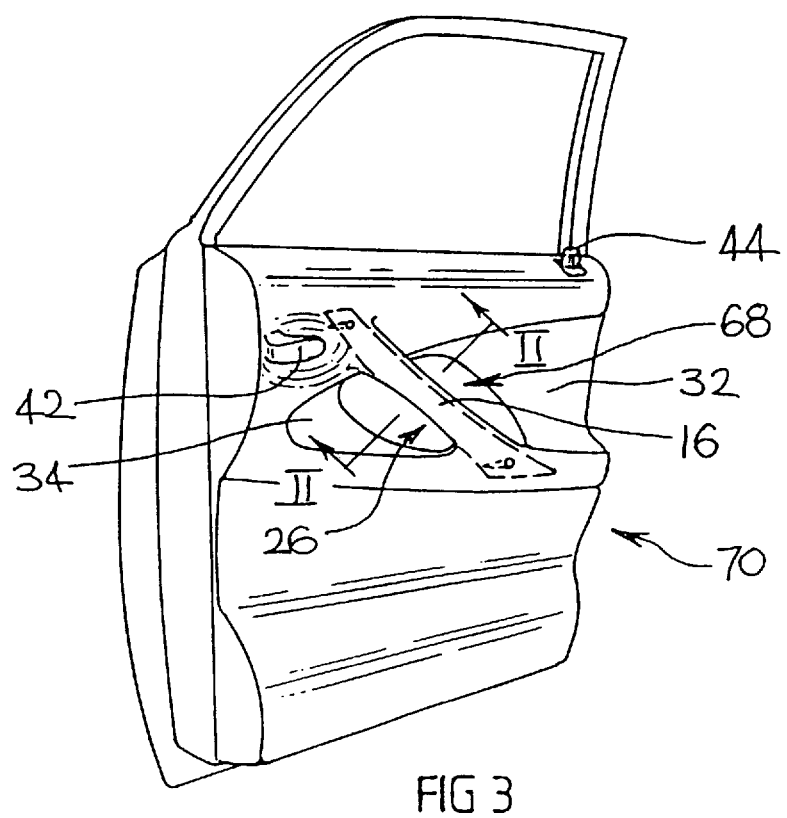
FIG. 3 is a perspective view of a vehicle door with a door panel of the present invention affixed thereto with a reinforcement shown in ghost lines.

Reinforcement member 46 is adapted to attach to insert 14 by screws 47 and 49 or by any other suitable affixing means. Reinforcement member 46 has features so that it can be securely affixed to an interior structural member of vehicle door as shown in FIG. 3.

In FIG. 4 bridge 16 has shoulders 18 and 20 which tuck around and retentively grip insert 14. In the region of the bridge 16 the thermoformable sheet 12 is substantially "C" shaped. It can be seen that the thermoformable sheet 12 consists of a multilayer structure comprising the thermoformable substrate 48 to which there is bonded a compressible cover layer 50 made up of a compressible foam 52 having a decorative skin 54 and a fabric layer 56 which is bonded to the thermoformable substrate 48. The decorative skin 54 overlies the thermoformable substrate 48 across all areas which may be exposed to view or contact by the vehicle occupant including a re-entrant portions 58 and 60.

Reinforcement member 46 may be covered in a compressible cover layer 61 similar in constructions to cover layer 50, i.e. having a compressible foam layer 62, a decorative skin 64 and a fabric layer 66 which may be affixed to reinforcement member 46 by any suitable means such as gluing, heat bonding or the like.

Reinforcement member 46 as screwed to insert 14 by screw 49. In combination, bridge 16, insert 14 and covered reinforcement member form the door pull which is shaped to be comfortably gripped by a vehicle occupant when closing or opening the door 70. As seen in FIG. 4 it is preferable that at entrant portions 58 and 60, the decorative skins 54 and 64 of thermoformable sheet 12 and reinforcement member 46 abut so that only the decorative skins 54 and 64 are visible or touchable by the vehicle occupant. Furthermore, reinforcement member 46 may act to secure the thermoformable sheet 12 about insert 14 when affixed to insert 14.

As shown in FIG. 4A preferably the junction between the thermoformable sheet 12 and compressible cover layer 61 at re-entrant portions 58 and 60 is such that there is minimum disruption to the smooth feet of the door pull. The shape of reinforcement member 46A may assist in this.

Figure 5:
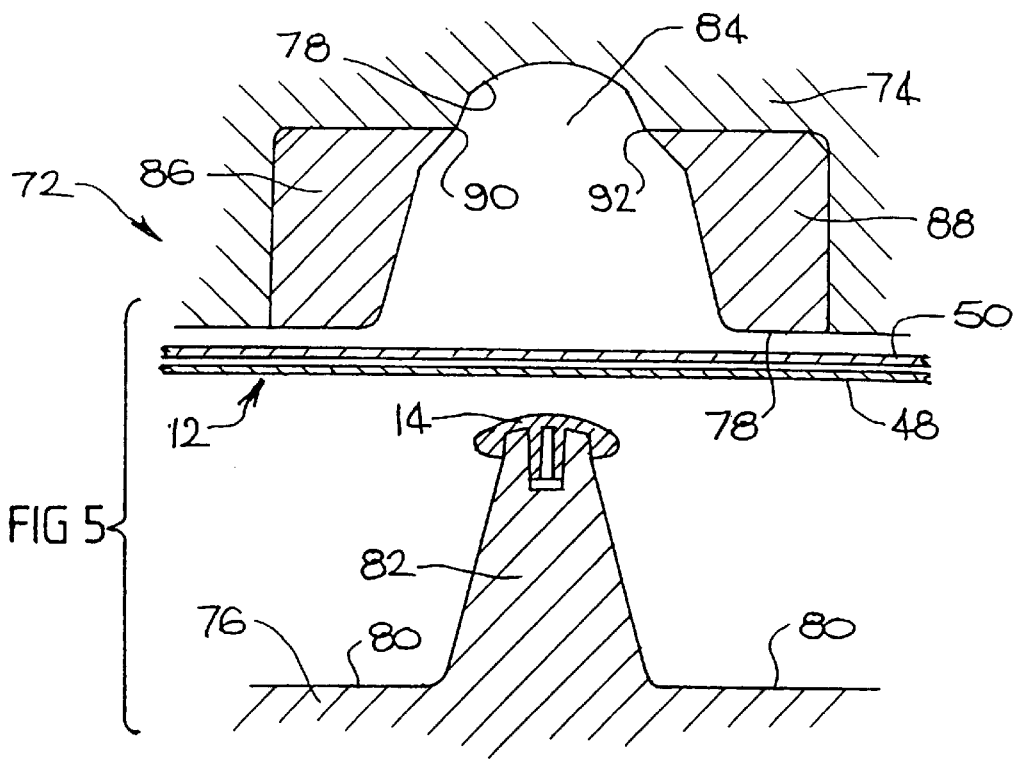

In FIG. 5 the apparatus for manufacturing a moulded article of the present invention consists of a moulding die 72 having upper and lower die portions 74 and 76 which have die faces 78 and 80. Die faces 78 and 80 collectively define a core and a cavity in the desired panel shape. As shown in FIG. 5, upper and lower die portions 74 and 76 are initially in an open position then insert 14 is placed on the core in a position set by a machined recess, whereupon a cover layer 50 and thermoformable substrate 48 are inserted between the upper and lower die portions. Thermoformable substrate 48 has previously been heated to a temperature where it has been thermally plasticised which may be in the order of about 180°C. Insert 14 is positioned on a projection 82 on lower die portion 76. Cover layer 50 is positioned adjacent die face 78 which corresponds with the exterior surface of the door trim once formed.

Figure 6:
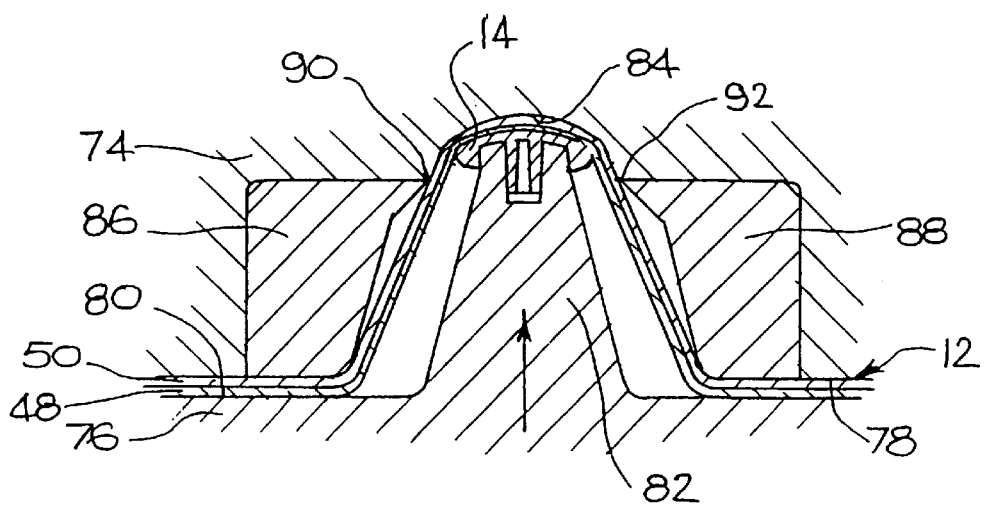

Turning to FIG. 6, upper and lower die portions 74 and 76 are brought together by a hydraulic press or other means known in the art of press moulding and substrate thermoformable 48 and cover layer 50 are pressed together and deformed into a mould cavity defined by die faces 78 and 80. Cover layer 50 and thermoformable substrate 48 thermally bond together and are deformed into cavity 84 around insert 14. Sliders 86 and 88 are in a retracted position.

Figure 7:
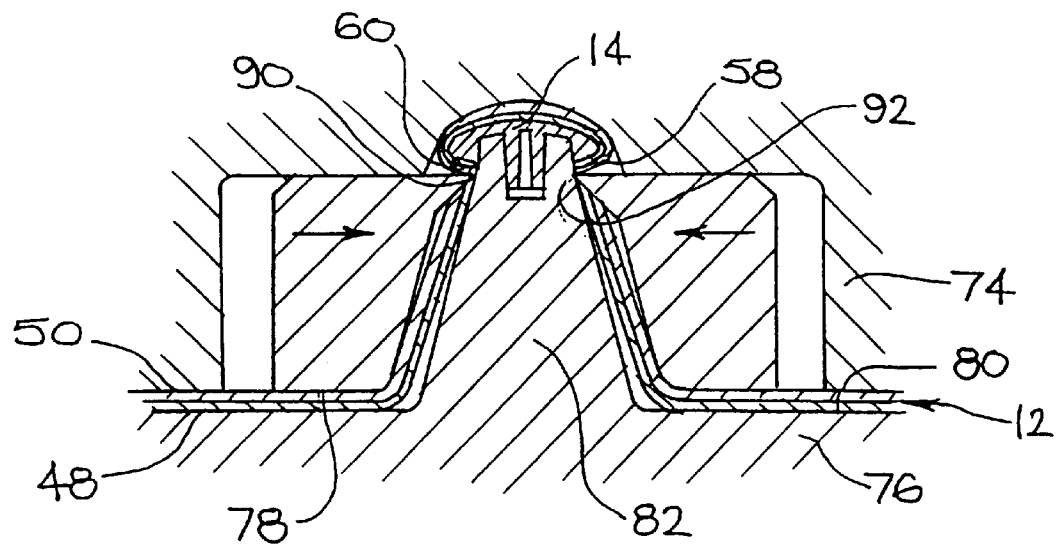

In FIG. 7, sliders 86 and 88 are actuated by any suitable means, for example pneumatic actuators, such that engagement surfaces 90 and 92 move into cavity 84. Engagement surfaces 90 and 92 which in the previous process steps have remained clear of cavity 84 now press upon thermoformable sheet 12, formed by fusing of thermoformable substrate 48 and cover layer 50, in the region of insert 14 and force the thermoformable sheet 12 about the underside insert 14 to form re-entrant portions 58 and 60. In one embodiment engagement surfaces 90 and 92 may act to sever thermoformable sheet 12 to form cut-outs 22 and 24. Thermoformable sheet 12 preferably has cooled and at least partially solidified at the end of this processing step so that it will retain its present shape if sliders 86 and 88 are retracted.

Figure 8:
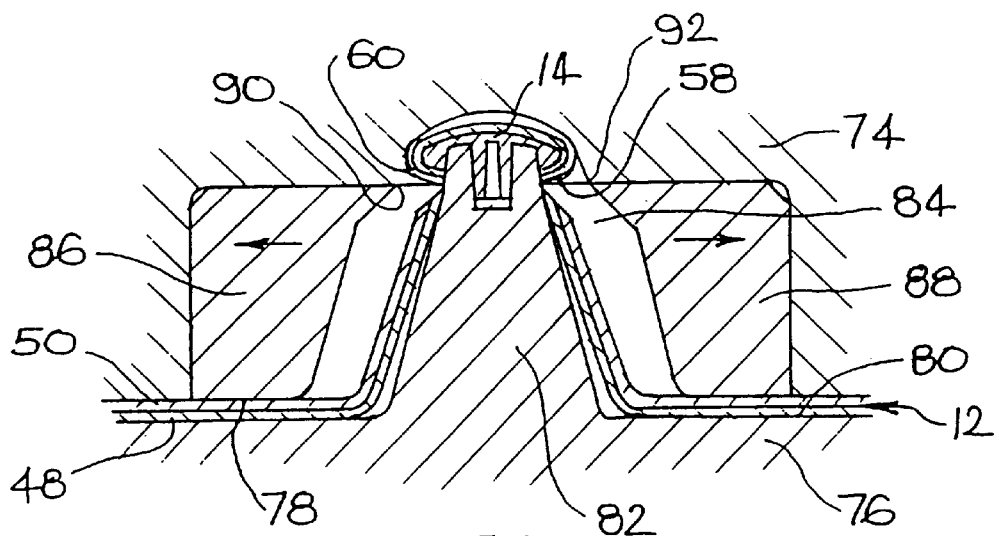

In FIG. 8, sliders 86 and 88 are caused to retract such that engagement surfaces 90 and 92 retract out of cavity 84. Engagement surfaces 90 and 92 must retract back out of cavity 84 such that when die portions 74 and 76 are moved to an open position, die lock does not occur.

FIG. 9 shows the final step in the processing where upper and lower die portions 74 and 76 are separated and the moulded door panel 10 is ejected and removed from the moulding die without die lock occurring about the region of door pull 26. Insert 14, is substantially enveloped by the thermoformable sheet 12 and at re-entrant portions 58 and 60 the insert 14 is covered with cover layer 50 so that none of the substrate 48 is visible to an occupant in a vehicle in which the door panel 10 is to be installed.

The reinforcement member 46 may then be screwed or otherwise affixed to insert 14, with the soft cover being exposed to the exterior of the door pull handle.

The formed door panel may then have additional features such as window winders, control panels and switches affixed thereto at appropriate times. Provision for such features may be made in the design of the dies used to produce the door panel. Portions cut out of the panel may be removed during the moulding process or optionally at a later stage as convenient.

The finished panel may be assembled with a vehicle door in any manner known in the art although it will be appreciated that the reinforcement member is preferably attached to a structural part of the door in any suitable manner.

It is to be understood that various modifications, additions and/or alterations may be made to parts previously described without departing from the ambit of the present invention.

What is claimed is:

1. A moulded interior door panel comprising:

a substantially rigid thermoformed sheet, and an insert, wherein a portion of said thermoformed sheet at least partially envelopes and retentatively grips said insert and wherein said thermoformed sheet comprises a thermoformed substrate having an upper surface and a lower surface, a compressible cover layer sheet bonded with said upper surface and whereby said insert abuts and is at least partially enveloped by a portion of the lower surface of said substrate, the portion of said thermoformed sheet which retentatively grips said insert forming a bridge having a surface which is continuous with the remainder of the thermoformable sheet, and wherein portions of said thermoformed sheet lateral to said bridge are cut out such that said bridge is capable of being grasped and completely encircled as a handle in that region.

2. A moulded interior door panel comprising:

a substantially rigid thermoformed sheet, an insert wherein a portion of said thermoformed sheet at least partially envelopes and retentatively grips the insert and forms a bridge having a surface which is continuous with the remainder of the thermoformed sheet, and a reinforcement member connectable to said insert and which is adapted to be fixed to a vehicle door.

3. A moulded interior door panel according to claim 2 wherein said reinforcement member, bridge and insert cooperatively form a door pull.

4. A moulded interior door panel according to claim 2 wherein said reinforcement member is covered by a compressible layer in the region where it cooperates with said bridge and insert to form said door pull.

5. A moulded interior door panel according to claim 2 wherein said reinforcement member overlies said re-entrant portions.

6. A moulded interior door panel according to claim 2 wherein said reinforcement member has webs adapted to abut against said re-entrant portions so as to maximize a smooth feel at the junction of said reinforcement member and said re-entrant portion.

7. A moulded interior door panel according to claim 2 wherein said reinforcement member has a first end which is adapted to be fixed to a first portion of a vehicle door such that a force applied to said door panel is transferred to said vehicle door through said reinforcement member.

8. A moulded interior door panel according to claim 7 further having a second end which is adapted to be fixed to a second portion of said vehicle.

9. A moulded interior door panel according to claim 2 wherein the shape of said reinforcement member together with said thermoformed sheet in the region of said bridge in transverse section is substantially arcuate.

10. A method for producing a moulded door panel comprising the steps of:
   (a) providing a moulding press including at least one moulding die having first and second die members movable in a reciprocating manner along a first axis between an open die position and a closed die position, said first and second members having opposite die faces defining a mould cavity therebetween when said moulding dies is in said closed position,
   said first die member having in said die face a region defining a recess and further including projecting means adjacent the recess having an engagement surface movable along a path angularly offset said first axis in a reciprocating manner when said moulding die is in said closed position between a position outside said cavity to a position within said cavity and said second die member has a projecting portion in its die face insertable into said cavity when said die members are in said closed position;
   (b) positioning an insert on said projecting portion of said second die face;
   (c) introducing a thermally plastified sheet between said die faces when said die members are in said open die position;
   (d) moving said die members to said closed position such that the portion of said sheet overlying said recess is deformed into said recess to form a projecting portion;
   (e) moving said projecting means such that said engagement surface moves into said recess and deforms said projecting part at least partially around said insert to form a re-entrant surface;
   (f) allowing said thermally plastified sheet to cool to at least partially solidify;
   (g) moving said projecting means to a position where said engagement surface is outside the recess;
   (h) moving said die to said open position; and
   (i) ejecting said moulded door panel, and wherein said insert remains substantially rigid during steps (b) through (i).

11. A method according to claim 11 wherein said engagement surface at least partially severs said plastified sheet adjacent said insert.

12. A method according to claim 10 wherein there is further provided the steps of
   introducing a cover layer between said thermally plastified sheet and said first die member in said open die position; and
   pressing said cover layer onto said thermally plastified sheet in said closed die position.

13. A method according to claim 10 wherein said cover layer is bonded to said thermally plastified sheet when pressed onto said thermally plastified sheet.

14. A method for producing a moulded door panel comprising the steps of:
   (a) providing a moulding press including at least one moulding die having first and second die members movable in a reciprocating manner along a first axis between an open die position and a closed die position, said first and second members having opposite die faces defining a mould cavity therebetween when said moulding dies is in said closed position,
   said first die member having in a portion of said die face remote from the periphery of said die face a region defining a recess and further including projecting means adjacent the recess having an engagement surface movable along a path angularly offset said first axis in a reciprocating manner when said moulding die is in said closed position between a position outside said cavity to a position within said cavity and said second die member has a projecting portion in its die face insertable into said cavity when said die members are in said closed position;
   (b) positioning a substantially rigid insert on said projecting portion of said second die face;
   (c) introducing a thermally plastified sheet between said die faces when said die members are in said open die position;
   (d) moving said die members to said closed position such that the portion of said sheet overlying said recess is deformed into said recess to form a projecting portion;
   (e) moving said projecting means such that said engagement surface moves into said recess and deforms said projecting part partially around said insert to form a bridge having a re-entrant surface and a surface which is continuous with the remainder of the thermoformed sheet;
   (f) allowing said thermally plastified sheet to cool to at least partially solidify;
   (g) moving said projecting means to a position where said engagement surface is outside the recess;
   (h) moving said die to said open position; and
   (i) ejecting said moulded door panel.

15. A method according to claim 14 wherein said engagement surface at least partially severs said plastified sheet adjacent said insert.

16. A method according to claim 14, wherein there is further provided the steps of:
   introducing a cover layer between said thermally plastified sheet and said first die member in said open die position; and
   pressing said cover layer onto said thermally plastified sheet in said closed die position.

17. A method according to claim 14 wherein said cover layer is bonded to said thermally plastified sheet when pressed onto said thermally plastified sheet.

18. A method according to claim 14 wherein said insert remains substantially rigid during steps (b) through (i).

* * * * *